Figure 1:
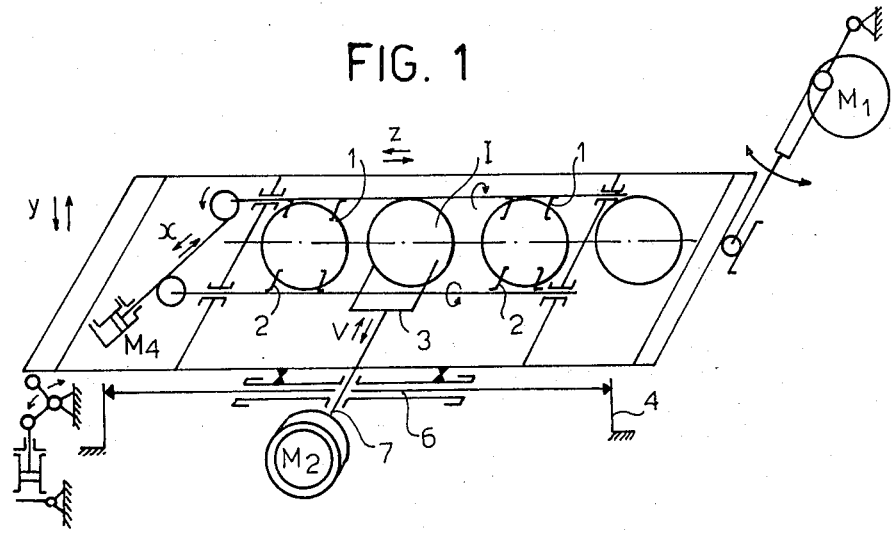

United States Patent [19]
Bronzini

[11] 3,797,638
[45] Mar. 19, 1974

[54] RECIPROCATING ARTICLE TRANSFER APPARATUS FOR MACHINE TOOLS

[76] Inventor: Bruno Bronzini, 18/4, Strada Alberoni, Turin, Italy

[22] Filed: June 17, 1971

[21] Appl. No.: 154,033

[30] Foreign Application Priority Data
July 31, 1970 Italy.................................. 69647/70

[52] U.S. Cl............ 198/33 AD, 198/218, 214/1 BB
[51] Int. Cl.............................................. B65g 47/24
[58] Field of Search .......... 214/1 BB, 1 Q; 198/218, 198/19, 33 AD

[56] References Cited
UNITED STATES PATENTS
2,176,251   8/1939   Duhan ........................... 214/1 BB X
2,909,265   10/1959  De Buighe ............................ 198/19
3,655,070   4/1972   Haydu.............................. 214/1 BB
3,456,814   7/1969   Bautz................................ 214/1 BB
3,074,531   1/1963   Pechy............................. 198/33 AD
2,857,038   10/1958  Noble et al. .................... 198/33 AD Primary Examiner—Richard E. Aegerter
Assistant Examiner—Douglas D. Watts
Attorney, Agent, or Firm—Young & Thompson

[57] ABSTRACT

Reciprocating article transfer apparatus for machine tools, comprises a vertically reciprocable main frame, a horizontally reciprocable subframe carried by the main frame, and a plurality of forks mounted pairwise on the subframe for vertical swinging movement about spaced parallel axes so that pairs of forks swing vertically toward and away from each other to engage and release workpieces. Turnover means can also be provided between adjacent pairs of forks, for inverting workpieces between work stations.

2 Claims, 3 Drawing Figures

PATENTED MAR 19 1974

3,797,638

SHEET 1 OF 2

INVENTOR
BRUNO BRONZINI
By Young + Thompson
ATTYS.

RECIPROCATING ARTICLE TRANSFER APPARATUS FOR MACHINE TOOLS

In my copending Pat. application Ser. No. 50,159, filed June 26, 1970 and now abandoned, a simple and practical apparatus to perform the automatic transfer and turnover of several workpieces was disclosed and claimed.

Its feature was that a set of forks approaches workpieces from outside to the centre, that forks close on workpieces, rise with them and the whole group is displaced in a longitudinal direction first, it goes down to the new working position and, finally, the forks open and are taken back to their home position.

In the meantime an improvement has been developed, that is the object of this application, according to which better results are achieved by placing the whole device for the automatic transfer and turnover of several workpieces not on the machine, but on the front of it.

Thus, in the present apparatus, a set of forks approach workpieces from outside to the centre, forks are pushed below workpieces and rise with them, the whole is displaced in a longitudinal direction first and then goes down to the new working position and, finally, forks are turned and carried back to their home position.

In the stage of the longitudinal displacement of the whole unit, the possibility of turning over workpieces by 180° may be provided for.

Figure 3:
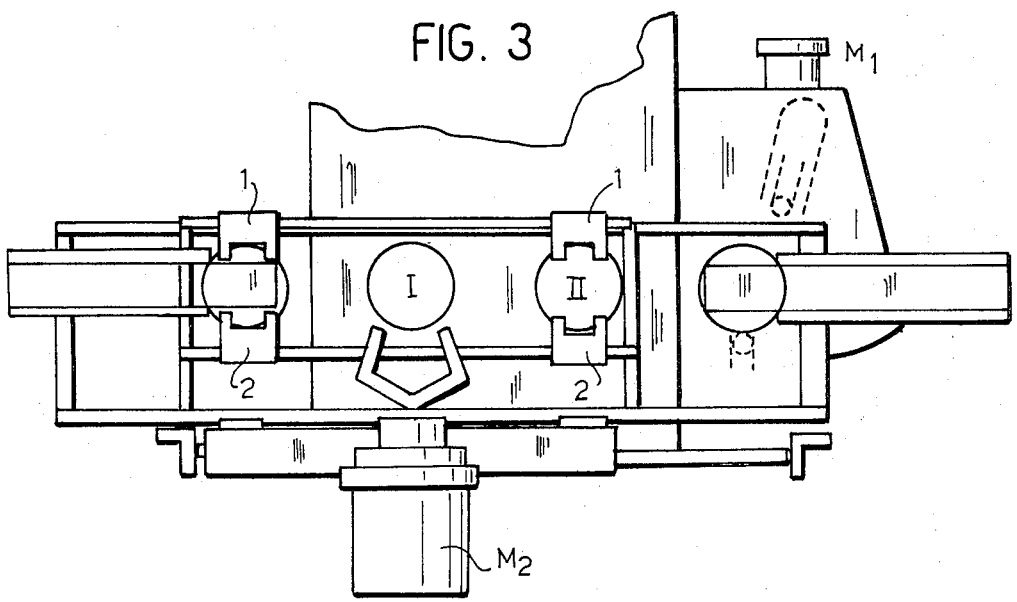
Figure 2:
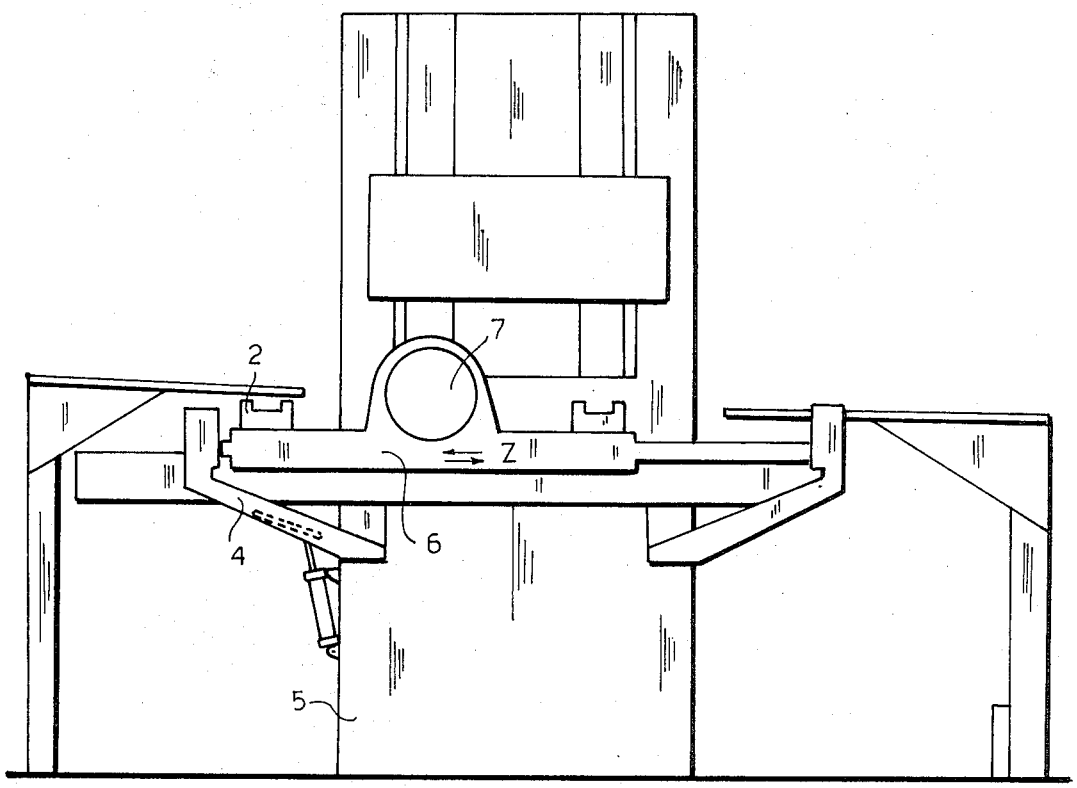

The invention will be understood better through the following specification of a preferred embodiment of the machine able to carry out the process in question, and the non-restrictive example is referred to the enclosed drawing, where:

FIG. 1 is a conventional representation of the successive movements that are made, FIG. 2 is a side elevational view and FIG. 3 is a top plan view of the machine in question.

With reference to FIG. 1, 1 and 2 mark two fork-holders. These fork-holders are able to perform a motion Y from top to bottom and vice versa, in which they are driven by a motor M3; moreover they are able to perform a revolving motion X and, finally, a longitudinal displacement Z, in which they are driven by a motor M1.

The unit works in the following way:

Forks 1 and 2 close under the workpieces to be displaced according to direction X, whereby they start the raising shown by the arrow and at the same time they lift workpieces. Thus, workpieces go up in the direction Y together with the forks.

Now, the forks, charged with workpieces, move in direction Z from left to right. If the process requires it, at the same time, fork 3 will perform a turnover by 180° of the workpiece it is carrying.

After reaching the work surface, the forks start lowering in direction Y and place the workpiece in the new working position; then, they open in direction X and, according to direction Z, fork-holders go in longitudinal direction from right to left to take in their starting position again.

In case of a turnover, fork 3 moves in direction V before the longitudinal reverse motion.

The whole system is driven by hydraulic cylinders or by other (mechanical, electrical,etc.,) means too, that can also differ from one movement to the other.

FIG. 2 and 3 show a scheme of the machine that is able to carry out the process in question.

The supports 4, that can be part of the machine frame 5 or be independent from it, carry the turnover group which consists of the element 6 that is able to go in the direction Z—Z because an element 7 is consolidated with the transfer system of element 6 and this element 7 can be displaced by means of a motor M2.

I and II mark working positions.

Opening and closing of forks 1 and 2 take place through a monitor M4.

Of course, the forks can be turned by other angles than 180° according to the operation that has to be performed on the workpiece.

Although the drawing shows three forks that can be displaced at the same time, of course, the forks can be different in number and each of them can be independent from the other, in particular as far as workpiece rotation is concerned.

Thus, while a fork turns over its workpiece by 180°, the other fork does not turn its workpiece at all or it turns it over by a larger or smaller angle than 180°.

In that way it will be possible to displace several workpieces and to perform several operations on them in a continuous process.

What we claim is:

1. Article transfer apparatus comprising a main frame, means for reciprocating said main frame vertically, a subframe carried by said main frame, means for reciprocating said subframe horizontally longitudinally relative to said main frame, a plurality of pairs of forks carried by said subframe for vertical swinging movement on and relative to the subframe, means for rotating the forks of each pair about spaced parallel horizontal axes in opposite directions, and turnover means between adjacent pairs of forks to rotate articles 180° about a horizontal axis perpendicular to said parallel axes.

2. Apparatus as claimed in claim 1, and means for reciprocating said turnover means along the last-named axis.

* * * * *